(12) United States Patent
White et al.

(10) Patent No.: US 6,918,407 B2
(45) Date of Patent: Jul. 19, 2005

(54) PNEUMATIC RESET RELIEF VALVE

(75) Inventors: Chris White, Houston, TX (US);
Richard D. Williams, Sugar Land, TX (US)

(73) Assignee: W. W. Offshore, Inc., Houston, TX (US)

( * ) Notice: Subject to any disclaimer, the term of this patent is extended or adjusted under 35 U.S.C. 154(b) by 325 days.

(21) Appl. No.: 10/214,876

(22) Filed: Aug. 8, 2002

(65) Prior Publication Data
US 2003/0029505 A1 Feb. 13, 2003

Related U.S. Application Data
(60) Provisional application No. 60/310,965, filed on Aug. 8, 2001.

(51) Int. Cl.[7] .............................................. F16K 21/00
(52) U.S. Cl. .................... 137/514.7; 137/553; 137/559; 251/15; 251/49
(58) Field of Search .............................. 137/514.7, 559, 137/553, 514; 251/15, 49

(56) References Cited

U.S. PATENT DOCUMENTS

| | | |
|---|---|---|
| 793,788 A | 7/1905 | Hockfeldt |
| 2,142,410 A | 1/1939 | Quick |
| 2,243,711 A | 5/1941 | Lamb |
| 2,361,881 A | 10/1944 | Sheppard |
| 2,516,247 A | 7/1950 | Neunemann |
| 3,550,617 A | 12/1970 | Johnson |
| 3,709,563 A | 1/1973 | Shellhause |
| 3,719,203 A * | 3/1973 | Wettre .......................... 137/554 |
| 4,213,480 A * | 7/1980 | Orum et al. ................. 137/556 |
| 4,221,204 A | 9/1980 | Meyer |
| 4,321,945 A | 3/1982 | Chabat-Courrede |
| 4,406,303 A * | 9/1983 | Kilmoyer ..................... 137/554 |
| 4,481,974 A | 11/1984 | Schmitt et al. |
| 4,497,338 A * | 2/1985 | Baker .......................... 137/467 |
| 4,531,542 A | 7/1985 | Looney |
| 4,617,959 A | 10/1986 | Yamada |
| 4,889,623 A | 12/1989 | Prior et al. |
| 5,647,397 A * | 7/1997 | Heiniger et al. ............ 137/559 |
| 5,685,333 A | 11/1997 | Skaryd |
| 5,975,129 A | 11/1999 | Williams |

* cited by examiner

Primary Examiner—A. Michael Chambers
(74) Attorney, Agent, or Firm—Law Office of Tim Cook P.C.

(57) ABSTRACT

A safety device protects a mud pump from an over pressure condition, which can occur during normal operation. The mud pump discharge couples to a high pressure inlet at the bottom of a valve body and the discharge outlet from the valve discharges to the side of the body, ninety degrees to the inlet. In a first aspect, the safety device includes a load piston mounted to a shaft which passes through a pressure chamber cap and connects to a pneumatic cylinder assembly on the top side of the pressure chamber cap. The pneumatic cylinder assembly is operated by a control valve mounted to the base of the cylinder to set the pressure at which the safety device actuates. In a further aspect, the safety device includes a light transmissive indicator cylinder, with a flag therein mounted on a rod coupling the valve to a pneumatic actuator piston, between the actuator piston and the valve.

8 Claims, 2 Drawing Sheets

PNEUMATIC RESET RELIEF VALVE

This application claims the benefit of U.S. Provisional application Ser. No. 60/310,965 filed Aug. 8, 2001.

FIELD OF THE INVENTION

The present invention relates generally to the field of pressure relief valves and, more particularly, to a pressure relief valve specially adapted for use with a positive displacement mud pump, the relief valve having a pneumatic reset feature.

BACKGROUND OF THE INVENTION

The present invention provides a pressure relief valve adapted to relieve an overpressure condition at the discharge of a mud pump. A mud pump, typically a triplex pump, delivers a large volume of mud flow for a drilling rig. The mud pump delivers drilling mud to the drill stem to flow down the string of drill pipe and out through the drill bit appended to the lower end of the drill stem. Then, the mud flow returns to the surface for recycling. To carry out its various functions, mud must flow at a substantial flow rate. A mud pump commonly delivers 1,000 gallons per minute through the drill stem at a discharge from the mud pump of 1,000 psi or more.

Any impediment in the flow path of the drilling mud results in an increase in the discharge pressure of the mud pump. In fact, pressure at the discharge of the mud pump will vary during normal operation. If this increase in pressure were to continue without corrective action, substantial damage would result to the mud pump or its associated downstream equipment or both. In U.S. Pat. No. 5,975,129, a hydraulically operated pressure relief valve solved many of these and related problems by providing a valve body including an inlet mud flow opening, an internal passage with a movable valve element to modulate flow, and a mud out let opening for connection to a mud reservoir. The movable valve element connected to a piston rod which was connected to a dual chamber, hydraulically operated, force-creating, air cushioned regulator which adjusted the force on the piston rod and thereby adjusted the position of the valve element. An over pressure condition forced the movable valve element up until a rod extension cleared its seal, permitting the valve to pop open. Hydraulic fluid was then applied to reset the valve to a position ready for subsequent operation.

This pressure relief valve proved very successful, but it required a separate hydraulic actuation and reset system. The present invention improves on that valve by providing a pneumatic setpoint and reset arrangement.

SUMMARY OF THE INVENTION

The present invention functions as a safety device to protect a mud pump from an over pressure situation, which can occur during normal operation. Over pressuring the mud pump can cause costly damage to the pump itself, and equipment connected to the pump.

The general arrangement of the valve places the high pressure inlet from the mud pump at the bottom of a valve body and the discharge outlet to the side of the body, ninety degrees to the inlet. The actuating mechanism, called the bonnet assembly, is situated at the top of the valve. The actuating mechanism includes a load piston mounted to a shaft which passes through a pressure chamber cap and connects to a pneumatic cylinder assembly on the top side of the pressure chamber cap. The bonnet is mounted to the top of the valve body by bolting the pressure chamber cap to the body. The pneumatic cylinder assembly is operated by a control valve mounted to the base of the cylinder.

Regulated air from the control valve pressurizes the volume above the upper cylinder. The control valve may be adjusted to set the mud pump discharge pressure at which the valve actuates. Upon an over pressure condition, the load piston moves up and by cam action the regulated air control valve will shut off. Simultaneously, the pressurized air above the upper piston vents out, allowing the valve to pop open, relieving the overpressure condition. When the cause of the overpressure condition has been corrected, air is ported to the chamber above the upper piston, resetting the valve, and again setting the control valve to supply regulated air pressure.

These and other features of the invention will be apparent to those of skill in the art from a review of the following detailed description along with the accompanying drawing.

BRIEF DESCRIPTION OF THE DRAWINGS

FIG. 2a is a side section view of another preferred embodiment of the invention. FIG. 2b is a top perspective view of the embodiment of FIG. 2a.

DETAILED DESCRIPTION OF PREFERRED EMBODIMENTS

Figure 1:
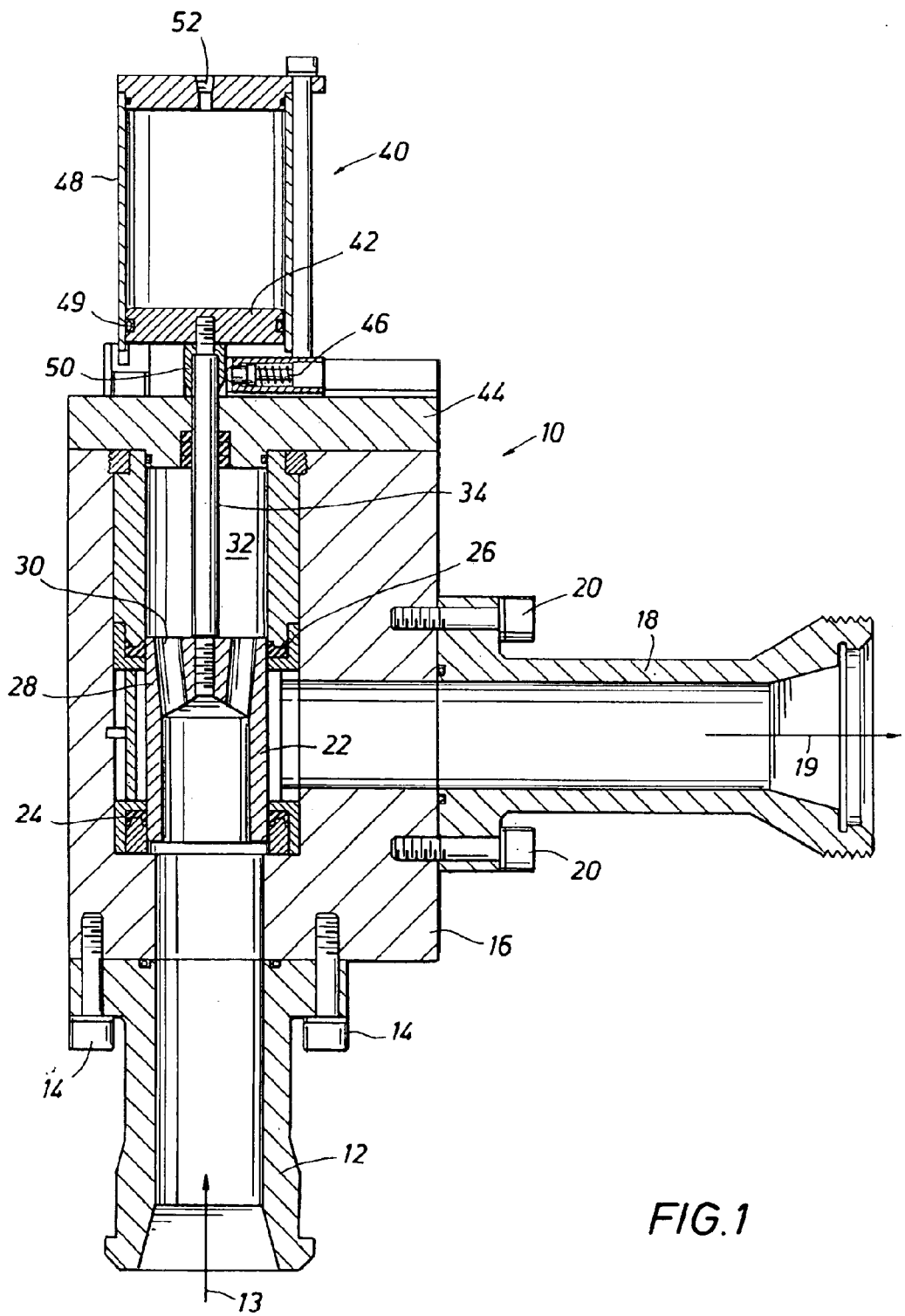
FIG. 1 is a side section view of the pressure relief valve of this invention in a first preferred embodiment.

Referring now to FIG. 1, a pressure relief valve 10 constructed in accordance with this invention is depicted. Discharge pressure from a mud pump (not shown) is directed into an inlet 12 as shown by an arrow 13. The inlet 12 is bolted by bolts 14 to a valve body 16. Upon an over pressure condition and actuation of the relief valve, discharge is directed from a discharge or outlet port 18, as shown by an arrow 19. The discharge 18 is bolted to the body 16 with bolts 20.

Positioned within the body 16 is a load piston 22. The load piston 22 is sealed with a lower seal element 24 and an upper seal element 26, both of which remain stationary as the load piston moves up and down in response to variations in mud pressure at the inlet 12. The load piston 22 includes a top bulkhead 28, through which are at least two ports 30. The ports 30 conduct pressure into an upper chamber 32, and thus the fluid pressure in the upper chamber tracks the pressure at the inlet 12. However, surface area on the underside of the bulkhead 28 is greater than the surface area above the bulkhead, due to the presence of a piston rod 34 coupled to the top of the bulkhead. Thus, an increase in pressure at the inlet 12, transmitted to the chamber 32, moves the load piston up.

The actuating mechanism for the relief valve includes a pneumatic cylinder assembly 40 mounted to the top of the body 16. The pneumatic cylinder assembly 40 comprises a top piston 42 coupled to the rod 34, which passes through a pressure chamber cap 44. The pneumatic cylinder assembly is mounted on the top side of the pressure chamber cap.

The pneumatic cylinder assembly is mounted to the top of the valve body by bolting the pressure chamber cap 44 to the body. The pneumatic cylinder assembly 40 is operated by a control valve 46 mounted to the base of a cylinder 48, which forms the body of the pneumatic cylinder assembly. The piston 42 includes a piston ring 49 which seal to the inside surface of the cylinder 48.

The control valve 46 supplies regulated air above the top piston 42 which in turn holds the load piston 28 in the downward most position by way of the rod 34. In this position, the load piston 28 blocks mud flow to the outlet port 18 and the valve 10 is considered closed. The regulated air balances the force applied to the load piston when the pump is operating at normal pressure. Adjusting the regulated air pressure supplied by the control valve 46 changes the setpoint at which the valve opens.

When the mud pump pressure exceeds the set pressure, the load piston 28 moves upward also moving the top piston upward. As the top piston moves up, a rocker arm 50 allows the control valve 46 to shift to its vent position. Venting the pressure from the pneumatic cylinder 48 allows the load piston 28 to "pop" up to the open position. With the valve in the open position, mud flow occurs from the high pressure inlet port 12 to the outlet port 18, thus relieving the pressure generated by the pump.

To reset or close the valve 10, air pressure is applied back through a vent 52 of the control valve. The pressure acting on the top piston 42 forces it and the load piston 28 back to the closed position. In the closed position, the control valve 46 shifts and once again applies the regulated air pressure to the top piston. The valve 10 is now ready for the next operating cycle.

Figures 2A, 2B:
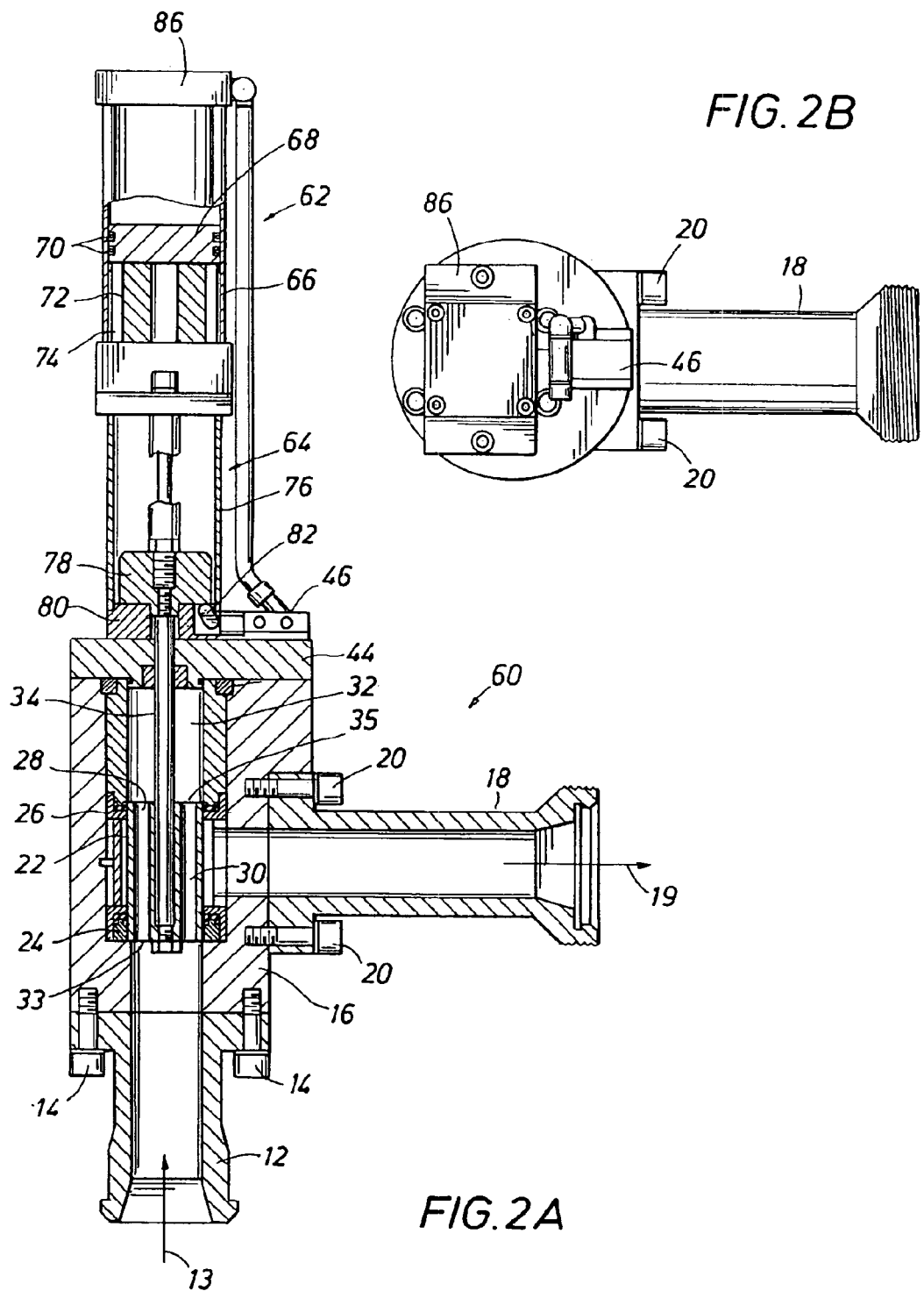

FIGS. 2a and 2b depict a presently preferred embodiment of the pneumatically operated pressure relief valve of this invention, wherein like components are numbered with the same element numbers as before. FIG. 2a depict a relief valve 60 and, as previously described in respect of FIG. 1, discharge pressure from a mud pump (not shown) is directed into the inlet 12 as shown by the arrow 13. The inlet 12 is bolted by bolts 14 to the valve body 16. Upon an over pressure condition and actuation of the relief valve, discharge is directed from the discharge or outlet port 18, as shown by the arrow 19. The discharge 18 is bolted to the body 16 with bolts 20.

Also as with the embodiment of FIG. 1, the load piston 22 is positioned within the body 16. The load piston 22 is sealed with the lower seal element 24 and the upper seal element 26, both of which remain stationary as the load piston moves up and down in response to variations in mud pressure at the inlet 12. The load piston 22 includes the top bulkhead 28, through which are at least two ports 30. The ports 30 conduct pressure into the upper chamber 32, and thus the fluid pressure in the upper chamber 32 tracks the pressure at the inlet 12. However, surface area on an underside 33 of the bulkhead 28 is greater than the surface area of a top surface 35 of the bulkhead, due to the presence of the piston rod 34 coupled to the top of the bulkhead. Thus, an increase in pressure at the inlet 12, transmitted to the chamber 32, moves the load piston up.

From this point on in this detailed description, the structure of the embodiment of FIGS. 2a and 2b differ from that of FIG. 1 in several respects. The actuating mechanism for the relief valve 60 includes a pneumatic cylinder assembly 62 mounted to the top of an indicator cylinder assembly 64. The cylinder assembly 62 comprises a cylinder body 66 which houses a piston 68, which seals to the interior surface of the cylinder body 66 with a set of piston rings 70. The top of the cylinder body is sealed by a top member 86. In its normal state, with the relief valve shut, the piston 68 rests atop a stop tube 72, which is surrounded by a co-axial booster spring 74. The booster spring 74 assists the movement of the piston 68 in the upward direction for actuation of the relief valve, as described in more detail below.

The indicator cylinder assembly 64 comprises a light transmissive cylinder body 76 which houses flag 78. Note that the flag 78 is not sealed to the interior surface of the cylinder body 76. This is because the indicator flag assembly provide indication of whether the relief valve is open or shut, as seen through the body 76, and further provides the control function for operation of the cylinder assembly 62, but the indicator cylinder 76 does not retain any pressure or support any substantial weight. The flag 78 is coupled to the rod 34, which passes through the pressure chamber cap 44, and the flag 78 normally rests atop a cylinder base 80. The indicator cylinder assembly 64 is mounted on the top side of the pressure chamber cap 44.

The pneumatic cylinder assembly 62 is operated by the control valve 46 mounted to the cylinder base 80. In this embodiment, upward motion of the flag 78 permits rotation of a rocker arm 82, which opens the control valve, thereby porting air pressure from on top of the piston 68. The relief valve is reset in the same fashion, as previously described in respect of FIG. 1.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

We claim:

1. A pressure regulator valve assembly for connection to the output of a pressure varied supply source, the assembly comprising:
    (a) a valve body having an inlet port and a discharge port, wherein the supply source output is delivered through the inlet port;
    (b) a pressure chamber between the inlet and outlet ports, the pressure chamber defining a cap;
    (c) a load piston in the pressure chamber for modulating flow between the inlet and outlet ports;
    (d) a rod coupled to the load piston and penetrating the cap;
    (e) a pneumatic control chamber counted to the cap;
    (f) a top piston connected to the rod and positioned within the pneumatic control chamber; and
    (g) a pneumatic control valve connected to the pneumatic control chamber, the pneumatic control valve adapted to set the pressure of the supply source at which the valve assembly opens.

2. The valve assembly of claim 1, wherein the load piston defines a chamber between the load piston and the cap.

3. The valve assembly of claim 2, further comprising a port through the load piston to convey pressure to the chamber.

4. The valve assembly of claim 1, wherein the rod defines a rod portion above the cap, and the rod portion defines a rocker arm to actuate the pneumatic control valve.

5. The valve assembly of claim 1, further comprising a port into the pneumatic control chamber adapted to receive pressurized air to reset the valve assembly.

6. A pressure regulator valve assembly for connection to the output of a pressure varied supply source, the assembly comprising:
    (a) a valve body having an inlet port and a discharge port, wherein the supply source output is delivered through the inlet port;
    (b) a pressure chamber between the inlet and outlet ports, the pressure chamber defining a cap;

(c) a load piston in the pressure chamber for modulating flow between the inlet and outlet ports;

(d) a rod coupled to the load piston and penetrating the cap;

a valve position indicator mounted to the cap;

(f) a pneumatic control chamber mounted to the indicator;

(g) a control piston connected to the rod and positioned within the pneumatic control chamber, and (h) a pneumatic control valve connected to the pneumatic control chamber, the pneumatic control valve adapted to set the pressure of the supply source at which the valve assembly opens.

7. The pressure regulator valve assembly of claim 6, wherein the valve position indicator comprises a light transmissive enclosure and a flag coupled to the rod, and wherein position of the flag indicates the position of the load piston.

8. The pressure regulator of claim 6, wherein the pneumatic control chamber comprises:

a. an air cylinder;

b. a piston within the air cylinder;

c. a stop tube beneath the piston d. a booster spring adjacent the stop tube and beneath the piston; and e. a vent line from the air cylinder at a point above the piston coupled to the pneumatic control valve.

\* \* \* \* \*